US 9,771,279 B2

(12) United States Patent
Strimple et al.

(10) Patent No.: US 9,771,279 B2
(45) Date of Patent: Sep. 26, 2017

(54) FOAM INTERCEPT SYSTEM

(71) Applicant: ALSTOM Technology Ltd, Baden (CH)

(72) Inventors: Damien Paul Strimple, Knoxville, TN (US); James Brian Loria, Maryville, TN (US); Peter Joseph Bogdanchik, Knoxville, TN (US); Paul Foster, Canton, GA (US)

(73) Assignee: General Electric Technology GmbH

( * ) Notice: Subject to any disclaimer, the term of this patent is extended or adjusted under 35 U.S.C. 154(b) by 87 days.

(21) Appl. No.: 14/674,573

(22) Filed: Mar. 31, 2015

(65) Prior Publication Data

US 2016/0289091 A1  Oct. 6, 2016

(51) Int. Cl.
 *C02F 1/40* (2006.01)
 *B01D 19/02* (2006.01)
 (Continued)

(52) U.S. Cl.
 CPC ............... *C02F 1/40* (2013.01); *B01D 19/02* (2013.01); *C02F 1/008* (2013.01); *C02F 1/74* (2013.01); *B03D 1/1462* (2013.01); *C02F 2103/08* (2013.01); *C02F 2103/18* (2013.01); *C02F 2201/002* (2013.01); *C02F 2209/008* (2013.01);
 (Continued)

(58) Field of Classification Search
 CPC .... C02F 7/00; C02F 1/40; C02F 1/008; C02F 1/24; C02F 1/72; C02F 1/62; C02F 1/74; C02F 2103/18; C02F 2103/08; C02F 2201/002; C02F 2303/12; C02F 2303/18; C02F 2209/008; C02F 2209/42; E02B 15/048; B01F 3/04446; B01D 19/02; B01D 53/50; B01D 17/0214; B03D 1/1462; B04B 15/04
 See application file for complete search history.

(56) References Cited

U.S. PATENT DOCUMENTS 2,857,081 A * 10/1958 Lung ................. B01D 19/0052
                                                        222/255
3,723,343 A * 3/1973 Herzhoff ............... B01D 19/02
                                                         96/177
(Continued)

FOREIGN PATENT DOCUMENTS

SG          178770 A1      3/2012
WO       2008/105212       9/2008
(Continued)

OTHER PUBLICATIONS

FUJITA-WO-2009014053-MT (translation and original attached).*
(Continued)

*Primary Examiner* — David C Mellon
*Assistant Examiner* — Liam Royce
(74) *Attorney, Agent, or Firm* — GE Global Patent Operation; Rita D. Vacca

(57) ABSTRACT

A foam intercept system and a method of using the foam intercept system are disclosed herein. The foam intercept system is useful to control levels of foam generated on the surface of effluent seawater during aeration of the effluent seawater in a seawater aeration basin. Effluent seawater contained within the seawater aeration basin may be produced in a seawater flue gas desulfurization system associated with a power plant or an aluminum production plant.

15 Claims, 3 Drawing Sheets

(51) Int. Cl.
*C02F 1/74* (2006.01)
*C02F 1/00* (2006.01)
*C02F 103/18* (2006.01)
*B03D 1/14* (2006.01)
*C02F 103/08* (2006.01)

(52) U.S. Cl.
CPC ...... *C02F 2209/42* (2013.01); *C02F 2303/12* (2013.01); *C02F 2303/18* (2013.01)

(56) References Cited

U.S. PATENT DOCUMENTS

| | | | |
|---|---|---|---|
| 3,883,426 A * | 5/1975 | Lewandowski | B03D 1/1437 210/707 |
| 4,336,035 A | 6/1982 | Evenstad et al. | |
| 4,502,872 A | 3/1985 | Ivester et al. | |
| 2013/0061669 A1 * | 3/2013 | Bogdanchik | G01F 23/26 73/304 C |
| 2015/0076079 A1 | 3/2015 | Papsai | |
| 2015/0275453 A1 * | 10/2015 | Skadeland | C02F 1/40 210/776 |

FOREIGN PATENT DOCUMENTS

| | | |
|---|---|---|
| WO | 2009014053 A1 | 1/2009 |
| WO | 2011065082 A1 | 6/2011 |
| WO | 2013042197 A1 | 3/2013 |

OTHER PUBLICATIONS

PCT Search Report and Written Opinion issued in connection with corresponding PCT Application No. PCT/US2016/024484 dated Jun. 10, 2016.

* cited by examiner

FOAM INTERCEPT SYSTEM

FIELD OF THE INVENTION

The present disclosure is for a foam intercept system useful for removing foam generated during treatment of effluent seawater contained in a seawater aeration basin associated with a seawater based flue gas desulfurization system.

The present disclosure is further directed to a method of using a foam intercept system to remove foam generated during treatment of effluent seawater contained in a seawater aeration basin associated with a seawater based flue gas desulfurization system.

BACKGROUND OF THE INVENTION

Process gases containing sulfur dioxide, $SO_2$, are generated in many industrial processes. One such industrial process is combustion of a fuel such as coal, oil, peat, waste, or the like, in a combustion plant such as a power plant. In such a power plant, a hot process gas often referred to as a flue gas, is generated. The generated flue gas contains pollutants such as for example acid gases, such as for example sulfur dioxide, $SO_2$. It is necessary to remove as much of the generated acid gases as possible from the flue gas before emitting the flue gas into ambient air. Another example of an industrial process that generates a process gas containing pollutants is electrolytic production of aluminum from alumina. In that process, a process gas or flue gas containing sulfur dioxide, $SO_2$, is generated within venting hoods of electrolytic cells. Similarly, it is necessary to remove as much of the generated sulfur dioxide, $SO_2$, as possible from the flue gas before emitting the flue gas into ambient air.

WO 2008/105212 discloses a boiler system comprising a boiler, a steam turbine system, and a seawater scrubber for flue gas desulfurization. The boiler generates, by combustion of a fuel, high-pressure steam utilized in the steam turbine system to generate electric power. Seawater is collected from the ocean, and is utilized as a cooling medium in a condenser of the steam turbine system. Afterward, the seawater is utilized in the seawater based flue gas desulfurization scrubber to absorb sulfur dioxide, $SO_2$, from flue gas generated in the boiler. Sulfur dioxide, $SO_2$, absorbed by the seawater upon contact therewith in the seawater based flue gas desulfurization scrubber forms sulfite and/or bisulfite ions. Effluent seawater from the seawater based flue gas desulfurization scrubber is forwarded to a seawater aeration basin for treatment. In the seawater aeration basin, air is bubbled through the effluent seawater forwarded from the seawater based flue gas desulfurization scrubber for oxidation of sulfite and/or bisulfite ions to sulfate ions. The sulfite and/or bisulfite ions therein are so oxidized to sulfate ions by means of oxygen gas contained in the bubbled air. The resulting inert sulfate ions in the treated effluent seawater may then be release back to the ocean.

One problem associated with effluent seawater treatment in a seawater aeration basin is foam generation on the surface of the effluent seawater. Generation of foam in seawater aeration basins requires construction of larger basins to contain not only the effluent seawater but also the generated foam. Construction of larger basins means larger capital, maintenance and operational outlays. Another problem, at the present time foam generated on the surface of the effluent seawater is typically released directly back to the ocean. However, generated foam often times carries a relatively high concentration of heavy metals unsuitable for release back to the ocean. With these problems in mind, a foam intercept system for controlling effluent seawater foam levels in effluent seawater aeration basins is needed to reduce associated capital, maintenance and/or operational expenses, and to reduce or prevent the release of heavy metals into the ocean. Likewise, a method of using a foam intercept system for controlling effluent seawater foam levels in effluent seawater aeration basins is needed to reduce associated capital, maintenance and/or operational expenses, and to reduce or prevent the release of heavy metals into the ocean.

SUMMARY OF THE INVENTION

The present disclosure provides a foam intercept system useful to remove and process foam generated on the surface of effluent seawater contained in a seawater aeration basin. Effluent seawater is generated in the removal of sulfur dioxide from a flue gas by contacting the flue gas containing sulfur dioxide with seawater in a scrubber constructed for such purpose. The effluent seawater generated in the scrubber is then treated in a seawater aeration basin. Control, reduction and/or elimination of generated foam levels on the surface of effluent seawater is achieved using the subject foam intercept system. The subject foam intercept system comprises a suction skimmer on a float frame arranged in a seawater aeration basin. The float frame is adjustable to alter the distance between the surface of the effluent seawater and the base opening of the suction skimmer. As such, the base opening of the suction skimmer is maintained a suitable distance above or just below the surface of the effluent seawater contained in the seawater aeration basin for the purpose of reducing draft and reducing the amount of effluent seawater drawn into the suction skimmer relative to the amount of surface foam drawn into the suction skimmer. Dual pumps are fluidly connected to the suction skimmer to draw generated foam from the surface of the effluent seawater for containment in a fluidly connected foam retention tank. The dual pumps may be used in combination. However, preferably, the dual pumps are used with one operating and the other as a spare to allow for on-line maintenance of the system. Upon destruction or dissipation of the foam in the foam retention tank, fluid is generated. The generated fluid contained in the foam retention tank may be transferred back to the seawater aeration basin, or alternatively, be transferred to a buffer tank for treatment, if necessary, prior to release to the ocean. As such, removing foam from the surface of the effluent seawater reduces or eliminates foam levels in or contained by the seawater aeration basin. By removing generated foam from the surface of the effluent seawater, the overall size of the seawater aeration basin may be reduced thereby reducing costs associated therewith. Once removed from the surface of the effluent seawater, the foam is destroyed or allowed to dissipate in the foam retention tank. Fluid produced by the destruction or dissipation of the foam in the foam retention tank is then recycled, collected, stored and/or treated prior to environmentally conservative disposal thereof.

An advantage of the subject foam intercept device is that the stated environmental objectives are achieved while also decreasing capital, maintenance and/or operational expenses associate therewith. By eliminating or controlling generated foam levels in the seawater aeration basin, the overall size of the seawater aeration basin may be reduced, thus reducing associated capital, maintenance and/or operational expenditures attributable thereto.

Another object of the present disclosure is to provide a method for controlling generated foam levels on the surface of effluent seawater. Effluent seawater is generated in the removal of sulfur dioxide from a flue gas by contacting the flue gas containing sulfur dioxide with seawater in a flue gas desulfurization scrubber constructed for such purpose. Effluent seawater generated in the seawater flue gas desulfurization scrubber is then treated in a seawater aeration basin. The above-stated objective is achieved by controlling foam levels generated on the surface of effluent seawater contained in a seawater aeration basin through a method of using the subject foam intercept system. As such, dual pumps are used to draw into the fluidly connected suction skimmer foam generated on the surface of the effluent seawater contained in the seawater aeration basin. The dual pumps may be used in combination. However, preferably, the dual pumps are used with one operating and the other as a spare to allow for on-line maintenance of the system. Generated foam suctioned by the suction skimmer is then contained in a fluidly connected foam retention tank. Upon destruction or dissipation of the foam in the foam retention tank, a fluid is generated. The generated fluid contained in the foam retention tank may be transferred back to the seawater aeration basin, or alternatively, be transferred to a buffer tank for treatment, if necessary, prior to release to the ocean. As such, fluid produced by foam destruction or dissipation is recycled, collected, stored and/or treated prior to environmentally conservative disposal thereof. By eliminating or controlling levels of generated foam on the surface of effluent seawater in the seawater aeration basin, the overall size of the seawater aeration basin may be reduced, thus reducing associated capital, maintenance and/or operational expenditures attributable thereto.

An advantage of the described method of using the subject foam intercept system is that the stated environmental objectives are achieved while also decreasing capital, maintenance and/or operational expenses associate therewith. By eliminating or controlling generated foam levels in the seawater aeration basin, the overall size of the seawater aeration basin may be reduced, thus reducing associated capital, maintenance and/or operational expenditures attributable thereto.

In summary, the subject disclosure provides a foam intercept system comprising a seawater aeration basin containing effluent seawater from an associated seawater flue gas desulfurization absorber and foam generated within the seawater aeration basin, a foam intercept device comprising a housing with an open base and an interior area defined by one or more walls, and an adjustable float frame supporting the housing a distance above or just below the surface of the effluent seawater and the generated foam, dual pumps fluidly connected to the housing, a jet pump fluidly connected to the housing, and a foam retention tank fluidly connected to the dual pumps and the jet pump arranged for containing generated foam transported by suction from the seawater aeration basin and arranged for containing dissipation fluid generated from dissipated and/or destroyed generated foam. Within this system, the dual pumps are operative to suction transport the generated foam from the seawater aeration basin to the foam retention tank. The dual pumps may be used in combination. However, preferably, the dual pumps are used with one operating and the other as a spare to allow for on-line maintenance of the system. Likewise, within this system the jet pump is operative to suction transport generated foam from the seawater aeration basin to the foam retention tank. Further, one or more level detectors are arranged within the foam retention tank for transmission of data signals to an associated control device. The associated control device enables remote control of valves controlling transport of generated foam by the dual pumps and/or by the jet pump suction. The subject system is operative such that generated foam suctioned by the dual pumps may bypass the jet pump in transport to the foam retention tank. Similarly, the subject system is operative such that generated foam suctioned by the jet pump may bypass the dual pumps in transport to the foam retention tank. Still further, the subject system comprises a treatment tank for treatment of dissipation fluid transported thereto from the foam retention tank.

The subject foam intercept device comprises a housing with an open base and an interior area defined by one or more walls, and an adjustable float frame supporting the housing a distance above or just below the surface of the effluent seawater and the generated foam. The adjustable float frame is adjustable by mechanical adjustors or air valves to vary the distance of open base relative to the surface of the effluent seawater and generated foam. Further, the subject foam intercept device may include on the housing, on the float frame, or as an independent device, one or more nozzles supplied with effluent seawater from the seawater aeration basin for spraying on the generated foam for destruction or dissipation thereof. The subject foam intercept device is connected to one or more pumps to generate a low pressure suction within the interior area to draw generated foam through the foam intercept device, through piping and into a foam retention tank.

A method of using the subject foam intercept system comprises providing a seawater aeration basin containing effluent seawater from a seawater flue gas desulfurization absorber and foam generated within the seawater aeration basin, providing a foam intercept device comprising a housing with an open base and an interior area defined by one or more walls, and an adjustable float frame supporting the housing a distance above or just below the effluent seawater and generated foam, suctioning the generated foam from the seawater aeration basin using dual pumps fluidly connected to the housing, using as needed a jet pump fluidly connected to the housing to suction generated foam from the seawater aeration basin, and providing a foam retention tank fluidly connected to the dual pumps and the jet pump to contain generated foam transported from the seawater aeration basin via the foam intercept device and associated pumps thereto. The subject method may further comprise adjusting the float frame to vary the distance of the housing open base relative to the surface of the effluent seawater. Further, the method may comprise adjusting a valve for generated foam bypass of the jet pump in suction transport of the generated foam to the foam retention tank, or adjusting a valve for generated foam bypass of the dual pumps in suction transport of the generated foam to the foam retention tank. The subject method may further comprise providing one or more level detectors within the foam retention tank for transmission of data signals to a control device for remote control of valves to control transport of generated foam through the system. Further, the subject method may comprise providing a strainer between the housing and associated pumps for removal of debris using the strainer, or providing a treatment tank for treatment of dissipation fluid transported thereto from the foam retention tank.

A method of using the subject foam intercept device comprises providing a foam intercept device comprising a housing with an open base and an interior area defined by one or more walls, and an adjustable float frame supporting the housing a distance above or just below the effluent seawater and generated foam, suctioning the generated foam from the seawater aeration basin using dual pumps fluidly connected to the housing, using as needed a jet pump fluidly connected to the housing to suction generated foam from the seawater aeration basin, and providing a foam retention tank fluidly connected to the dual pumps and the jet pump to contain generated foam transported from the seawater aeration basin via the foam intercept device and associated pumps thereto. The subject method may also comprise adjusting the adjustable float frame by mechanical adjustors or air valves to vary the distance of the open base with respect to the surface of the effluent seawater and generated foam. Further, the method of using the subject foam intercept device may include spraying from one or more nozzles arranged on the housing, on the float frame, or as an independent device, effluent seawater supplied from the seawater aeration basin onto the generated foam for destruction or dissipation thereof.

Further objects and features of the present disclosure will be apparent from the following description and claims.

BRIEF DESCRIPTION OF THE DRAWINGS

The invention will now be disclosed in more detail with reference to the appended drawings described below.

DETAILED DESCRIPTION

Figure 1:
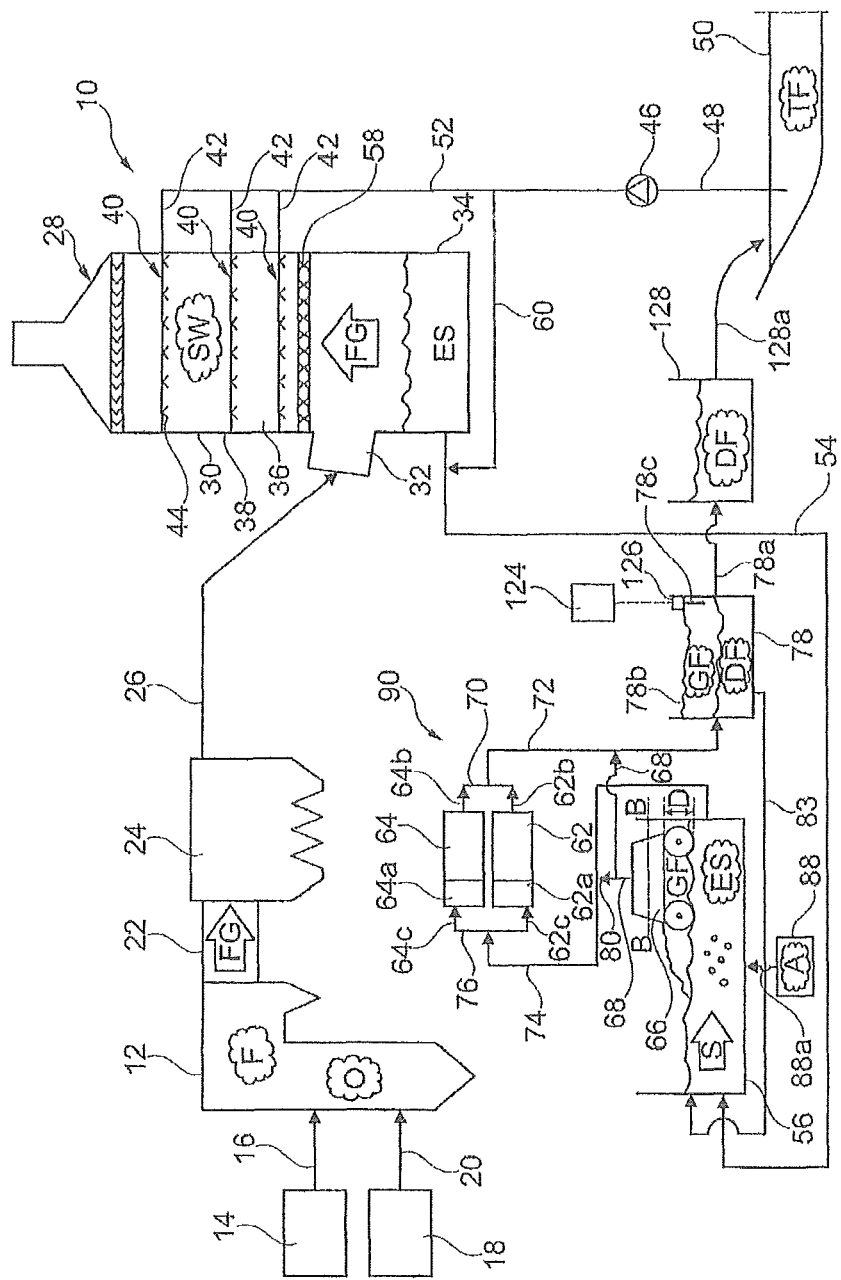
FIG. 1 is a schematic side cross-section view of a power plant with apparatus according to the present disclosure.

FIG. 1 is a schematic side cross-section view illustrating a power plant 10. The power plant 10 comprises a boiler 12 to which a fuel F, such as coal, oil, or the like, is supplied from a fuel source 14 through a fluidly connected feeding pipe 16 to boiler 12 for combustion therein. Fuel F is combusted in boiler 12 in the presence of oxygen O, supplied to boiler 12 via a fluidly connected oxygen supply duct 20 from an oxygen source 18. The oxygen O supplied to boiler 12 may, for example, be supplied in the form of air, and/or in the form of a mixture of oxygen gas and recirculated power plant flue gas FG. In such a case, boiler 12 would be what is commonly called an "oxy-fuel" boiler. The combustion of the fuel F generates a hot process gas in the form of a flue gas FG. Sulphur species contained in fuel F, upon combustion of the fuel F, form sulphur dioxide, $SO_2$. As such, power plant 10 flue gas FG includes as a portion thereof sulphur dioxide.

Produced flue gas FG flows from the boiler 12, via a fluidly connected duct 22, to a particulate collection device 24, in the form of a fabric filter or electrostatic precipitator. The particulate collection device 24, such as an electrostatic precipitator as described in U.S. Pat. No. 4,502,872, serves to remove dust and/or ash particles entrained in the flue gas FG. Alternatively, a fabric filter such as that described in U.S. Pat. No. 4,336,035, may be used for particulate collection of flue gas dust and/or ash from the flue gas FG. As an alternate embodiment, particulate collection device 24 may be arranged downstream of a seawater based flue gas desulfurization system 28. As still another embodiment, particulate collection device 24 may be eliminated from the system with particulate removal occurring solely in the seawater based flue gas desulfurization system 28, as discussed in more detail below. As known to those skilled in the art, additional equipment may be included downstream of boiler 12 for various purposes. However, for purposes of simplicity and clarity, such additional equipment options are not described herein.

According to the present embodiment illustrated in FIG. 1, the flue gas FG from which most of the ash and/or dust particles have been removed, flows from the particulate collection device 24 via a fluidly connected duct 26 to a seawater based flue gas desulfurization system 28. The seawater based flue gas desulfurization system 28 comprises a wet scrubber tower or absorber 30. An inlet 32 is arranged at a lower portion 34 of the absorber 30. The duct 26 is fluidly connected to the inlet 32, such that flue gas FG flowing from particulate collection device 24 via duct 26 may enter interior 36 of absorber 30 via inlet 32.

After entering interior 36, flue gas FG flows vertically upward through absorber 30, as indicated by arrow FG. Central portion 38 of absorber 30 is equipped with a number of spray arrangements 40 arranged vertically one above each other. For purposes of simplicity in the embodiment illustrated in FIG. 1, there are three such spray arrangements 40. Typically, there are 1 to 20 such spray arrangements 40 in an absorber 30. Each spray arrangement 40 comprises a supply pipe 42 and a number of nozzles 44 fluidly connected to the respective supply pipe 42. Seawater SW supplied via the respective supply pipes 42 to the nozzles 44 is atomized by means of the nozzles 44 to contact in interior 36 of absorber 30 flue gas FG flowing therethrough. As such, contact between the seawater SW and flue gas FG enables seawater SW absorption of sulphur dioxide, $SO_2$, from the flue gas FG within interior 36 of absorber 30.

A pump 46 is arranged for pumping seawater SW via fluidly connected suction pipe 48 from a seawater supply or ocean 50, through a fluidly connected pressure pipe 52 and further through fluidly connected supply pipes 42.

In accordance with an alternative embodiment, seawater SW pumped by pump 46 to supply pipes 42 may be seawater SW previously utilized as cooling water in steam turbine systems (not shown) associated with the boiler 12 prior to supplying such seawater SW to absorber 30.

In accordance with an alternative embodiment, the seawater based flue gas desulfurization system 28 may comprise one or more layers of a packing material 58 arranged in interior 36 of absorber 30. The packing material 58, which may be made from plastic, steel, wood, or another suitable material, enhances gas-liquid contact. With packing material 58, the nozzles 44 would merely distribute seawater SW over packing material 58, rather than atomizing the seawater SW for contact with the flue gas FG. Examples of packing material 58 include MELLAPAK™ packing available from Sulzer Chemtech AG, Winterthur, CH, and PALL™ rings available from Raschig GmbH, Ludwigshafen, DE.

Seawater SW atomized by nozzles 44 in interior 36 of absorber 30 flows downwardly in absorber 30 for contact and absorption of sulphur dioxide from the flue gas FG flowing vertically upwardly in interior 36 of absorber 30. Absorption of sulphur dioxide by the seawater SW in interior 36 forms effluent seawater ES collected in lower portion 34 of absorber 30. Effluent seawater ES collected in lower portion 34 of absorber 30 is drained or flows via a fluidly connected effluent pipe 54 to seawater aeration basin 56.

Optionally, if needed, fresh seawater SW may be added to the effluent seawater ES flowing through effluent pipe 54 to seawater aeration basin 56. To this end, an optional pipe 60 may be fluidly connected to pressure pipe 52 to supply a flow of fresh seawater SW to fluidly connected effluent pipe 54 forwarding effluent seawater ES to seawater aeration basin 56. Hence, an intermixing of fresh seawater SW and effluent seawater ES may occur in effluent pipe 54. As another optional alternative (not illustrated), the fresh seawater SW supplied via pipe 60 may be forwarded directly to the seawater aeration basin 56 to mix with the effluent seawater ES therein. As a still further option (not illustrated), residual waters and/or condensates generated in the boiler 12 or steam turbine systems (not shown) associated therewith could be added to and mixed with the effluent seawater ES in the seawater aeration basin 56.

The absorption of sulphur dioxide in interior 36 of absorber 30 is assumed to occur according to the following reaction:

$$SO_2(g) + H_2O \Rightarrow HSO_3^-(aq) + H^+(aq) \qquad [eq. 1.1a]$$

The bisulphite ions, $HSO_3^-$, may, depending on the pH value of the effluent seawater ES, dissociate further to form sulphite ions, $SO_3^{2-}$, in accordance with the following equilibrium reaction:

$$HSO_3^-(aq) \Longleftrightarrow SO_3^{2-}(aq) + H^+(aq) \qquad [eq. 1.1b]$$

Hence, as an effect of the absorption of sulfur dioxide, the effluent seawater ES will have a lower pH value as an effect of the hydrogen ions, $H^+$, generated in the absorption of sulfur dioxide, than that of the fresh seawater SW from the ocean 50, and will contain bisulphite and/or sulphite ions, $HSO_3^-$ and $SO_3^{2-}$, respectively. Bisulphite and/or sulphite ions are oxygen demanding substances, and the release thereof to the ocean 50 is restricted.

Figure 2:
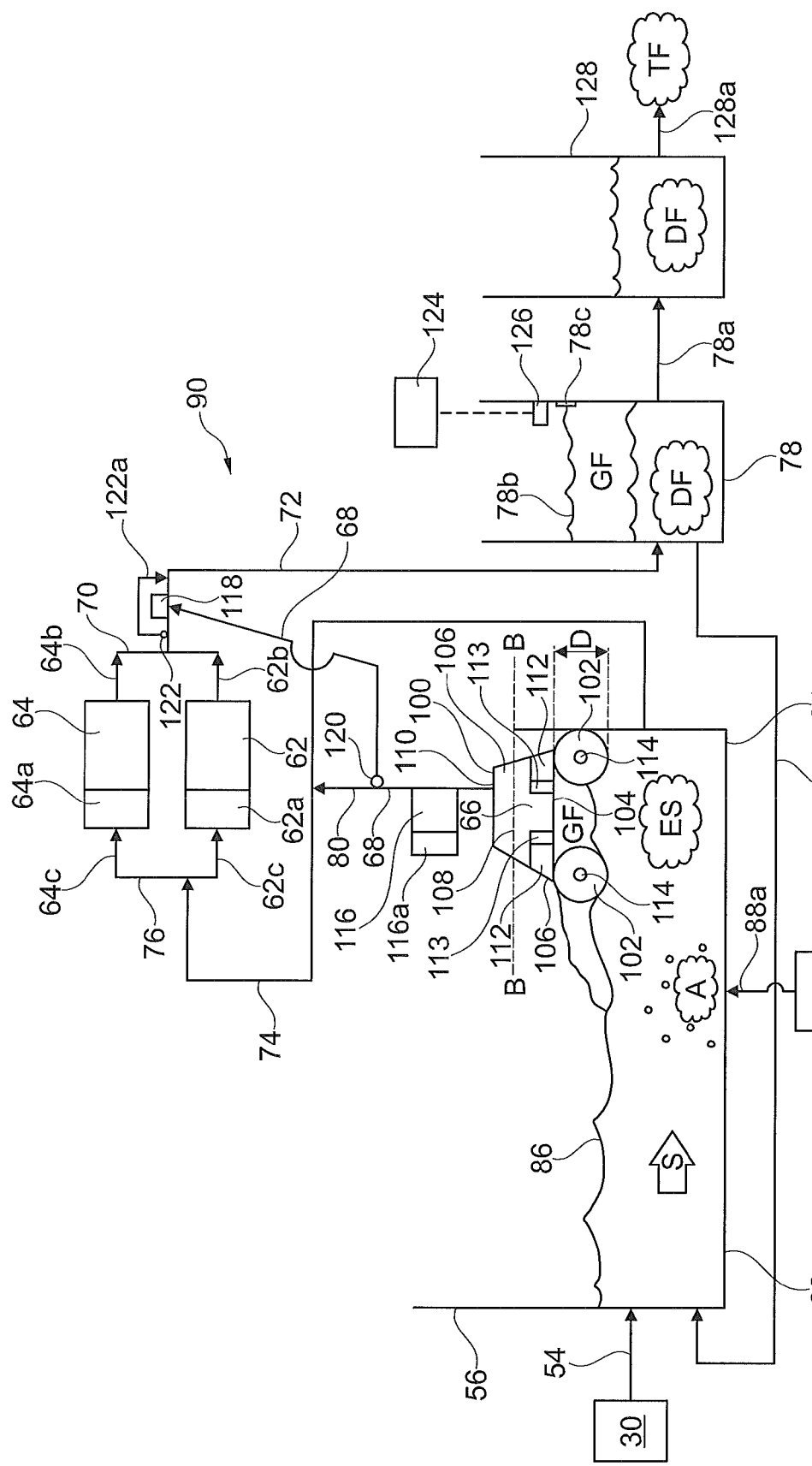
FIG. 2 is a schematic enlarged side cross-section view of the seawater based flue gas desulfurization system seawater aeration basin equipped with the subject foam intercept device and system according to FIG. 1.
Figure 3:
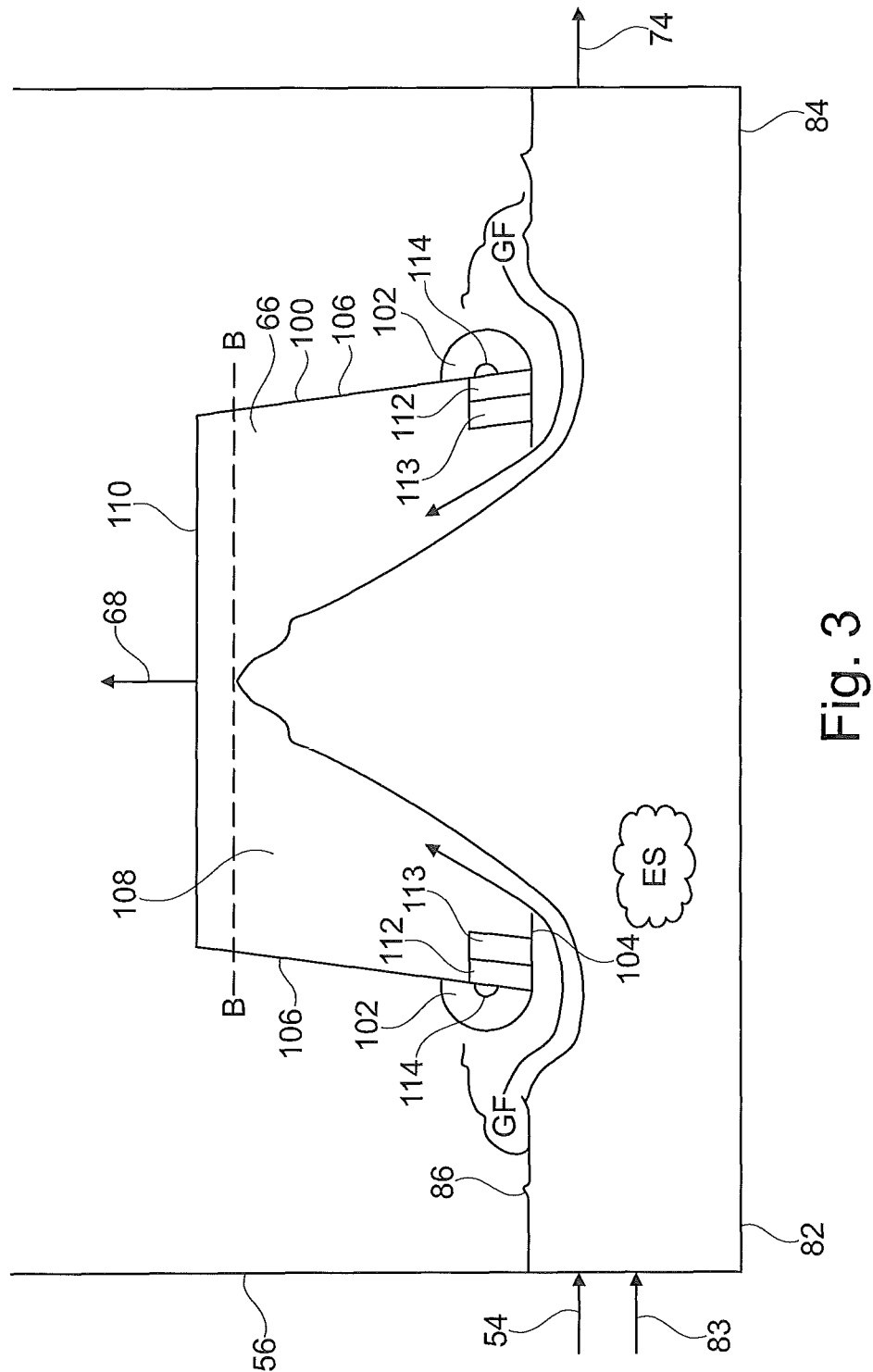
FIG. 3 is a schematic enlarged side cross-section view of the seawater aeration basin of FIG. 2 equipped with the subject foam intercept device.

In the seawater aeration basin 56 illustrated in FIGS. 2 and 3, the bisulphite and/or sulphite ions, $HSO_3^-$ and/or $SO_3^{2-}$, are oxidized by reacting the same with oxygen in accordance with the following reactions:

$$HSO_3^- + H^+ + \tfrac{1}{2}O_2(g) \Rightarrow SO_4^{2-} + 2H^+ \qquad [eq. 1.2a]$$

$$SO_3^{2-} + 2H^+ + \tfrac{1}{2}O_2(g) \Rightarrow SO_4^{2-} + 2H^+ \qquad [eq. 1.2b]$$

The seawater aeration basin 56 includes dual pumps 62, 64 driven by motors 62a, 64a operative for pumping and thereby creating a low pressure draw within suction skimmer 66 via draw pipe 68. Dual pumps 62, 64 are fluidly connected to output lines 62b, 64b fluidly connected to common line 70 fluidly connected to foam retention tank 78 via piping 72. Suction skimmer 66 is fluidly connected to piping 72 via draw pipe 68. Likewise, dual pumps 62, 64 are fluidly connected to input lines 62c, 64c fluidly connected to common line 76 fluidly connected to seawater aeration basin 56 via piping 74. Draw pipe 68 of suction skimmer 66 is also fluidly connected to piping 74 via fluidly connected piping 80. To complete the circuit, foam retention tank 78 is fluidly connected to seawater aeration basin 56 via pipe 83.

FIG. 2 illustrates the subject foam intercept system 90 in more detail. Effluent seawater ES is supplied to the seawater aeration basin 56 at a first end 82 of seawater aeration basin 56 via fluidly connected effluent pipe 54 fluidly connected to absorber 30. The effluent seawater ES flows, generally horizontally as indicated by arrow S, from the first end 82 to a second end 84 of seawater aeration basin 56. As effluent seawater ES flows from the first end 82 to second end 84, a foam GF is generated on a surface 86 of effluent seawater ES near second end 84. Such generated foam GF may carry a relatively high concentration of heavy metals such as mercury and the like.

An oxygen supply 88 supplies oxygen containing gas or air A to the effluent seawater ES of seawater aeration basin 56 via fluidly connected pipe 88a. Oxygen containing gas or air A is so supplied to effluent seawater ES for purposes of aerating the effluent seawater ES. As such, oxygen containing gas or air A supplied to effluent seawater ES by oxygen supply 88 via pipe 88a is dispersed in and mixed with effluent seawater ES to oxidize bisulphite and/or sulphite ions present therein to form inert sulfates.

As noted above, effluent seawater ES flows, generally horizontally as indicated by arrow S, from the first end 82 to the second end 84 of seawater aeration basin 56. As effluent seawater ES flows from the first end 82 to second end 84 generated foam GF builds and collects on surface 86 of effluent seawater ES by turbulence and aeration near second end 84.

To prevent foam GF from building on surface 86 of effluent seawater ES, a low pressure is generated in suction skimmer 66 by operation of dual pumps 62, 64 fluidly connected to foam intercept device 66. The dual pumps 62, 64 may be used in combination. However, preferably, the dual pumps 62, 64 are used with one operating and the other as a spare to allow for on-line maintenance of the system 90. Foam intercept device 66 comprises a housing 100 with an open base 104 removably attached to a float frame 102. Housing 100 is removably attached to float frame 102 for purposes of maintenance and/or for portability as an option apart from fixed installation. Float frame 102 is adjustable for purposes of varying the distance D of housing 100 open base 104 with respect to the surface 86 of effluent seawater ES as illustrated in FIG. 3. As such, float frame 102 may include mechanical adjustors 112 and/or air valves 114 for input/output of air from float frame 102 to vary the buoyancy of float frame 102. By varying the distance D of housing 100 open base 104 with respect to the surface 86 of effluent seawater ES, the amount of effluent seawater ES drawn into the suction skimmer 66 relative to the amount of generated foam GF drawn into the suction skimmer 66 is controlled. Optionally, foam intercept device 66 and/or float frame 102 may include one or more spray nozzles 113 supplied with fluid from effluent seawater ES contained in seawater aeration basin 56 for spraying on generated foam GF for destruction thereof. As another option, one or more spray nozzles 113 supplied with fluid from effluent seawater ES contained in seawater aeration basin 56 may be arranged as an independent device for spraying fluid on generated foam GF for destruction thereof.

Further, housing 100 of foam intercept device 66 comprises one or more walls 106 depending on the shape thereof. If of a round cross-section taken horizontally across housing 100 at line B-B, housing 100 will have one wall 106 defining open base 104 and open interior area 108 thereof. If of a square cross-section taken horizontally across housing 100 at line B-B, housing 100 will have four walls 106 defining open base 104 and open interior area 108 thereof. If of a triangular cross-section taken horizontally across housing 100 at line B-B, housing 100 will have three walls 106 defining open base 104 and open interior area 108 thereof. Opposite open base 104 is top 110 of housing 100. Top 110 of housing 100 is fluidly connected to draw pipe 68. Via draw pipe 68, dual pumps 62, 64 generate a low pressure draw within open interior area 108 of housing 100 for suction of generated foam GF from surface 86 of effluent seawater ES for transport to foam retention tank 78. The dual pumps 62, 64 may be used in combination. However, preferably, the dual pumps 62, 64 are used with one operating and the other as a spare to allow for on-line maintenance of the system 90. Using the subject foam intercept system 90, generated foam GF may be transported to the foam retention tank 78 via one or more routes.

One route in transporting generated foam GF from seawater aeration basin 56 to foam retention tank 78 comprises generated foam GF flowing from surface 86 of effluent seawater ES through open base 104 of housing 100 of foam intercept device 66, through draw pipe 68 and optional strainer 116 with differential pressure transmitter 116*a*, through valve 120 and removable jet pump 118, through piping 72 and into fluidly connected foam retention tank 78. As an alternative to or in addition to particulate collection device 24, optional strainer 116 may be used with on-line cleaning for removal of particulate debris to prevent the particulate debris from entering dual pumps 62, 64 and/or jet pump 118. Optional strainer 116 is preferably equipped with a differential pressure transmitter 116*a* to detect fouling of strainer 116 and allow for remote control adjustment of flow control valves 120, 122 for maintenance thereof.

Another route in transporting generated foam GF from seawater aeration basin 56 to foam retention tank 78 comprises generated foam GF flowing from surface 86 of effluent seawater ES through open base 104 of housing 100 of foam intercept device 66, through draw pipe 68 and optional strainer 116 with differential pressure transmitter 116*a*, through valve 120 and piping 80, through piping 74, through common line 76, through one or both input lines 62*c*, 64*c*, through one or both dual pumps 62, 64, through one or both output lines 62*b*, 64*b*, through common line 70, through piping 72, valve 122, jet pump 118 and into fluidly connected foam retention tank 78. Valves 120, 122 may be independently and remotely operated by control unit 124 based on data signals received from level detector 126 in foam retention tank 78.

Still another route in transporting generated foam GF from seawater aeration basin 56 to foam retention tank 78 comprises generated foam GF flowing from surface 86 of effluent seawater ES through open base 104 of housing 100 of foam intercept device 66, through draw pipe 68 and optional strainer 116 with differential pressure transmitter 116*a*, through valve 120 and piping 80, through piping 74, through common line 76, through one or both input lines 62*c*, 64*c*, through one or both dual pumps 62, 64, through one or both output lines 62*b*, 64*b*, through common line 70, through piping 72, through valve 122 and bypass piping 122*a*, back through piping 72 and into fluidly connected foam retention tank 78. Valves 120, 122 may be independently and remotely operated by control unit 124 based on data signals received from one or more level detectors 126 in foam retention tank 78.

Generated foam GF transported to foam retention tank 78 is with time destroyed or dissipated in the foam retention tank 78 thereby producing a dissipation fluid DF. The resultant dissipation fluid DF in foam retention tank 78 may be transported through fluidly connected pipe 83 to seawater aeration basin 56. Alternatively, or in addition to transporting dissipation fluid DF through pipe 83, dissipation fluid DF may be transported from foam retention tank 78 via fluidly connected pipe 78*a* to fluidly connected treatment tank 128. In treatment tank 128, the dissipation fluid DF may be treated to adjust the pH thereof, to remove heavy metals therefrom, and/or any other treatment that may be needed to produce a treated fluid TF suitable for environmentally conservative release thereof through pipe 128*a*.

Within foam retention tank 78, remaining particulates within foam intercept system 90 rise to the surface 78*b* from where the particulates may be removed via valve opening 78*c*. Valve opening 78*c* may be manually operated, or remotely operated through control unit 124.

In summary, the subject disclosure provides a foam intercept system 90 comprising a seawater aeration basin 56 containing effluent seawater ES from an associated seawater flue gas desulfurization absorber 30 and foam GF generated within the seawater aeration basin 56, a foam intercept device 66 comprising a housing 100 with an open base 104 and an interior area 108 defined by one or more walls 106, and an adjustable float frame 102 supporting the housing 100 a distance D relative to the surface 86 of the effluent seawater ES and the generated foam GF, dual pumps 62, 64 fluidly connected to the housing 100, a jet pump 118 fluidly connected to the housing 100, and a foam retention tank 78 fluidly connected to the dual pumps 62, 64 and the jet pump 118 arranged for containing generated foam GF transported by suction from the seawater aeration basin 56 and arranged for containing dissipation fluid DF generated from dissipated and/or destroyed generated foam GF. Within this system 90, the dual pumps 62, 64 are operative to suction transport the generated foam GF from the seawater aeration basin 56 to the foam retention tank 78. The dual pumps 62, 64 may be used in combination. However, preferably, the dual pumps 62, 64 are used with one operating and the other as a spare to allow for on-line maintenance of the system 90. Likewise, within this system 90 the jet pump 118 is operative to suction transport generated foam GF from the seawater aeration basin 56 to the foam retention tank 78. Further, one or more level detectors 126 are arranged within the foam retention tank 78 for transmission of data signals to an associated control device 124. The associated control device 124 enables remote control of valves 120, 122 controlling transport route of generated foam GF suctioned by one or both of the dual pumps 62, 64 and/or by the jet pump 118. The subject system 90 is operative such that generated foam GF suctioned by one or both of the dual pumps 62, 64 may bypass the jet pump 118 in transport to the foam retention tank 78. Similarly, the subject system 90 is operative such that generated foam GF suctioned by the jet pump 118 may bypass the dual pumps 62, 64 in transport of the generated foam GF to the foam retention tank 78. Still further, the subject system 90 comprises a treatment tank 128 for treatment of dissipation fluid DF transported thereto from the foam retention tank 78.

The subject foam intercept device 66 comprises a housing 100 with an open base 104 and an interior area 108 defined by one or more walls 106, and an adjustable float frame 102 supporting the housing 100 a distance D above or just below the surface 86 of the effluent seawater ES and the generated foam GF. The adjustable float frame 102 is adjustable by mechanical adjustors 112 and/or air valves 114 to vary the distance D of open base 104 with respect to the surface 86 of the effluent seawater ES and generated foam GF. Further, the subject foam intercept device 66 may include on the housing 100, on the float frame 102, or as an independent device one or more nozzles 113 supplied with effluent seawater ES from the seawater aeration basin 56 for spraying on the generated foam GF for destruction or dissipation thereof. The subject foam intercept device 66 is connected to one or more pumps 62, 64, 118 to generate a low pressure suction within the interior area 108 to draw generated foam GF through the foam intercept device 66, through piping 68, 72 and into a foam retention tank 78.

A method of using the subject foam intercept system 90 comprises providing a seawater aeration basin 56 containing effluent seawater ES from a seawater flue gas desulfurization absorber 30 and foam GF generated within the seawater aeration basin 56, providing a foam intercept device 66 comprising a housing 100 with an open base 104 and an interior area 108 defined by one or more walls 106, and an adjustable float frame 102 supporting the housing 100 a distance D above or just below the surface 86 of the effluent seawater ES and generated foam GF, suctioning the generated foam GF from the seawater aeration basin 56 using one or both dual pumps 62, 64 fluidly connected to the housing 100, using as needed a jet pump 118 fluidly connected to the housing 100 to suction generated foam GF from the seawater aeration basin 56, and providing a foam retention tank 78 fluidly connected to the dual pumps 62, 64 and the jet pump 118 to contain generated foam GF transported from the seawater aeration basin 56 via the foam intercept device 66 and associated pumps 62, 64, 118 thereto. The subject method may further comprise adjusting the float frame 102 to vary the distance D of the housing 100 open base 104 with respect to the surface 86 of the effluent seawater ES. Further, the method may comprise adjusting a valve 120, 122 for generated foam GF bypass of the jet pump 118 in transport of the generated foam GF to the foam retention tank 78, or adjusting a valve 120 for generated foam GF bypass of the dual pumps 62, 64 in transport of the generated foam GF to the foam retention tank 78. The subject method may further comprise providing one or more level detectors 126 within the foam retention tank 78 for transmission of data signals to a control device 124 for remote control of valves 120, 122 to control transport route of generated foam GF through the system 90. Further, the subject method may comprise providing a strainer 116 between the housing 100 and associated pumps 62, 64, 118 for removal of debris using the strainer 116, or providing a treatment tank 128 for treatment of dissipation fluid DF transported thereto from the foam retention tank 78.

A method of using the subject foam intercept device 66 comprises providing a housing 100 with an open base 104 and an interior area 108 defined by one or more walls 106, and an adjustable float frame 102 supporting the housing 100 a distance D above or just below the surface 86 of the effluent seawater ES and generated foam GF, suctioning the generated foam GF from the seawater aeration basin 56 using one or more dual pumps 62, 64 fluidly connected to the housing 100, using as needed a jet pump 118 fluidly connected to the housing 100 to suction generated foam GF from the seawater aeration basin 56, and providing a foam retention tank 78 fluidly connected to the dual pumps 62, 64 and the jet pump 118 to contain generated foam GF transported from the seawater aeration basin 56 via the foam intercept device 66 and associated pumps 62, 64, 118 thereto. The subject method may also comprise adjusting the adjustable float frame 102 by mechanical adjustors 112 or air valves 114 to vary the distance D of open base 104 with respect to the surface 86 of the effluent seawater ES and generated foam GF. Further, the method of using the subject foam intercept device 66 may include spraying from one or more nozzles 113 arranged on the housing 100, on the float frame 102, or as an independent device effluent seawater ES supplied from the seawater aeration basin 56 onto the generated foam GF for destruction or dissipation thereof.

While the present device and method has been described with reference to a number of preferred embodiments, it will be understood by those skilled in the art that various changes may be made and equivalents may be substituted for elements thereof without departing from the scope thereof. In addition, many modifications may be made to adapt a particular situation or material to the teachings of the subject device and/or method without departing from the essential scope thereof. Therefore, it is intended that the subject device and/or method not be limited to the particular embodiments disclosed as the best mode contemplated and set forth herein, but rather will include all embodiments falling within the scope of the appended claims. Moreover, any use of the terms first, second, etc. do not denote any order or importance, but rather the terms first, second, etc. are used to distinguish one element from another.

It will be appreciated that numerous modifications of the embodiments described above are possible within the scope of the appended claims.

The invention claimed is:

1. A foam intercept system comprising:
 a seawater aeration basin containing effluent seawater from an associated seawater flue gas desulfurization absorber and foam generated within the seawater aeration basin;
 a foam intercept device floating on a surface of the effluent seawater contained in the seawater aeration basin comprising:
  a housing with an open base, an interior area defined by one or more walls above the open base, and a top opposite the open base; and
  an adjustable float frame removably attached below the housing supporting the housing above the surface of the effluent seawater, with the adjustable float frame comprising mechanical adjustors and/or air valves for adjustable arrangement of the open base of the housing a distance above or just below the surface of the effluent seawater and generated foam contained in the seawater aeration basin;
 dual pumps fluidly connected to the housing;
 a jet pump fluidly connected to the housing; and
 a foam retention tank fluidly connected to the dual pumps and the jet pump arranged for containing generated foam transported by suction from the seawater aeration basin and for containing dissipation fluid generated from dissipated and/or destroyed generated foam.

2. The system of claim 1, wherein one or both dual pumps are operative to suction transport the generated foam from the seawater aeration basin to the foam retention tank.

3. The system of claim 1, wherein the jet pump is operative to suction transport generated foam from the seawater aeration basin to the foam retention tank.

4. The system of claim 1, further comprising one or more level detectors within the foam retention tank for transmission of data signals to a control device.

5. The system of claim 1, further comprising one or more level detectors within the foam retention tank for transmission of data signals to a control device for remote control of valves controlling transport route of generated foam to the foam retention tank.

6. The system of claim 1, wherein generated foam suctioned by one or both of the dual pumps bypasses the jet pump in transport to the foam retention tank.

7. The system of claim 1, wherein generated foam suctioned by the jet pump bypasses the dual pumps in transport to the foam retention tank.

8. The system of claim 1, further comprising a treatment tank for treatment of dissipation fluid transported thereto from the foam retention tank.

9. A method of using a foam intercept system comprising:
 providing a seawater aeration basin containing effluent seawater from a seawater flue gas desulfurization absorber and foam generated within the seawater aeration basin;

providing a foam intercept device floating on a surface of the effluent seawater contained in the seawater aeration basin comprising:
  a housing with an open base, an interior area defined by one or more walls above the open base, and a top opposite the open base; and
  an adjustable float frame removably attached below the housing supporting the housing above the surface of the effluent seawater, with the adjustable float frame comprising mechanical adjustors and/or air valves for adjustable arrangement of the open base of the housing a distance above or just below the surface of the effluent seawater and generated foam contained in the seawater aeration basin;
suctioning the generated foam from the seawater aeration basin using one or both dual pumps fluidly connected to the housing;
using as needed a jet pump fluidly connected to the housing to suction generated foam from the seawater aeration basin; and
providing a foam retention tank fluidly connected to the dual pumps and the jet pump to contain generated foam transported from the seawater aeration basin via the foam intercept device and associated pumps.

10. The method of claim 9, further comprising adjusting the float frame to vary the distance of the housing open base with respect to the surface of the effluent seawater.

11. The method of claim 9, further comprising adjusting a valve for generated foam bypass of the jet pump in transport to the foam retention tank.

12. The method of claim 9, further comprising adjusting a valve for generated foam bypass of the dual pumps in transport to the foam retention tank.

13. The method of claim 9, further comprising providing one or more level detectors within the foam retention tank for transmission of data signals to a control device for remote control of valves to control transport route of the generated foam through the system.

14. The method of claim 9, further comprising providing a strainer between the housing and associated pumps for removal of debris using the strainer.

15. The method of claim 9, further comprising a treatment tank for treatment of dissipation fluid transported thereto from the foam retention tank.

* * * * *